United States Patent
Dhruv et al.

(10) Patent No.: US 8,468,936 B2
(45) Date of Patent: Jun. 25, 2013

(54) ENERGY AND WATER CONSERVATION IN COOLING OF CONTAINERS CONTAINING HEATED PRODUCTS

(75) Inventors: Ashok Dhruv, Englewood, CO (US); Rei-Young Amos Wu, Palatine, IL (US)

(73) Assignee: Stokely-Van Camp, Inc., Chicago, IL (US)

( * ) Notice: Subject to any disclaimer, the term of this patent is extended or adjusted under 35 U.S.C. 154(b) by 995 days.

(21) Appl. No.: 12/146,114

(22) Filed: Jun. 25, 2008

(65) Prior Publication Data
US 2009/0004349 A1    Jan. 1, 2009

Related U.S. Application Data

(60) Provisional application No. 60/946,654, filed on Jun. 27, 2007.

(51) Int. Cl.
*A23L 3/18* (2006.01)

(52) U.S. Cl.
USPC ............ 99/470; 99/471; 426/520; 426/521

(58) Field of Classification Search
USPC ............ 99/452, 453, 455, 469, 470, 483, 99/516, 517, 534, 536, 468, 454; 426/410, 426/395; 422/25
See application file for complete search history.

(56) References Cited

U.S. PATENT DOCUMENTS

| | | | | |
|---|---|---|---|---|
| 4,263,254 A * | 4/1981 | Huling | ............................. | 422/25 |
| 4,331,629 A * | 5/1982 | Huling | ............................. | 422/25 |
| 4,441,406 A * | 4/1984 | Becker et al. | ................... | 99/275 |
| 4,490,401 A * | 12/1984 | Becker et al. | ................. | 426/407 |
| 4,637,936 A * | 1/1987 | White et al. | ................... | 426/523 |
| 4,704,958 A * | 11/1987 | Braymand | ...................... | 99/470 |
| 4,773,321 A * | 9/1988 | Wijts | ............................. | 99/468 |
| 4,989,668 A * | 2/1991 | Shimizu | ......................... | 165/47 |
| 5,012,727 A * | 5/1991 | Pesente | ......................... | 99/470 |
| 5,209,157 A * | 5/1993 | Sanchez Rodriguez | ........ | 99/455 |
| 5,750,174 A * | 5/1998 | Lucassen | ..................... | 426/521 |
| 5,772,958 A * | 6/1998 | Nielsen | .............................. | 422/1 |
| 5,804,240 A * | 9/1998 | Madlener | ..................... | 426/410 |
| 6,019,033 A * | 2/2000 | Wilson et al. | ................... | 99/470 |
| 6,142,065 A * | 11/2000 | Panella et al. | ................... | 99/468 |
| 6,352,021 B1 * | 3/2002 | Panella et al. | ................... | 99/468 |
| 6,588,327 B2 * | 7/2003 | Wakabayashi et al. | ......... | 99/470 |
| 6,787,175 B2 * | 9/2004 | Pedrick et al. | ................ | 426/549 |
| 7,464,559 B2 * | 12/2008 | Chu et al. | ........................ | 62/171 |
| 2001/0046543 A1 * | 11/2001 | Land | ............................. | 426/521 |
| 2008/0066803 A1 * | 3/2008 | Wu et al. | .................... | 137/15.06 |
| 2010/0297313 A1 * | 11/2010 | Koulik et al. | ................. | 426/234 |

* cited by examiner

Primary Examiner — Gene Kim
Assistant Examiner — John E Simms, Jr.
(74) *Attorney, Agent, or Firm* — Banner & Witcoff, Ltd.

(57) ABSTRACT

A system comprising a pre-heater located downstream of where a product stream is formed and upstream of a heater that heats the product stream to a desired temperature, the pre-heater comprising a circulating stream of a first heat transfer stream that pre-heats the food product, a container cooler comprising a circulating stream of a second heat transfer stream that cools containers containing the heated food product coming out of the heater, and a heat exchanger where heat from the second heat transfer stream is transferred to the first heat transfer stream. A method for using the system is also disclosed. The product can be a food product, including but not limited to a beverage. The container containing the heated product can be any suitable container, including but not limited to bottles and cans.

26 Claims, 7 Drawing Sheets

ENERGY AND WATER CONSERVATION IN COOLING OF CONTAINERS CONTAINING HEATED PRODUCTS

FIELD OF THE INVENTION

This invention relates to water and energy conservation in systems that require heating of a liquid for process considerations, such as a chemical, bio-chemical, enzymatic and or microbial reaction, filling the liquid in a container and subsequently cooling the filled container to a lower temperature for label application, storage or any other purpose. The heated liquid may be a food product, including, but not limited to, heated beverages that are placed in containers. The invention is illustrated for cooling of beverage containers containing heated beverages, but the disclosure herein encompasses cooling of containers containing heated non-beverages and similar processes.

BACKGROUND

Beverages frequently need to be heated to reduce microbial load and achieve desired shelf life. These beverages have to be further filled hot into containers (e.g., container made from polyethylene terephthalate (PET), or glass bottles and/or aluminum cans) and sealed so as to eliminate microbial contamination, again for a desired shelf life of the finished product-container combination. These containers then need to be cooled down to below about 100° F. to reduce product degradation, to allow for application of labeling to the containers, and for extended storage during warehousing at the manufacturing facility, and for extended storage during shipping, warehousing at distributor and eventually at customer facilities and/or consumer homes prior to eventual consumption. It is also useful to cool containers down to below about 100° F. at the manufacturing facility so that label can be applied to the containers.

Thus, the product itself is filled hot, and sealed in containers, and the product's heat serves to thermally process the "product-container" unit for required shelf life, sensory properties and control of microbial organisms present in an industrial food processing operation. This "hot-fill" process is common in the industry. The "product-container" unit has to be cooled down from filling temperatures, i.e., around 165° F.-200° F. down to below 70 to 105° F. for downstream operations of labeling, storage and transport. Conventional practice is to cool these containers in a forced convection moving belt cooler, wherein the containers travel countercurrent under a spray of cooling water. This cooling water picks up the heat from containers and rejects it at a cooling tower, as is common in industrial practice. Massive amounts of energy and water (via evaporation, etc.) are rejected at the cooling tower.

Figure 1:
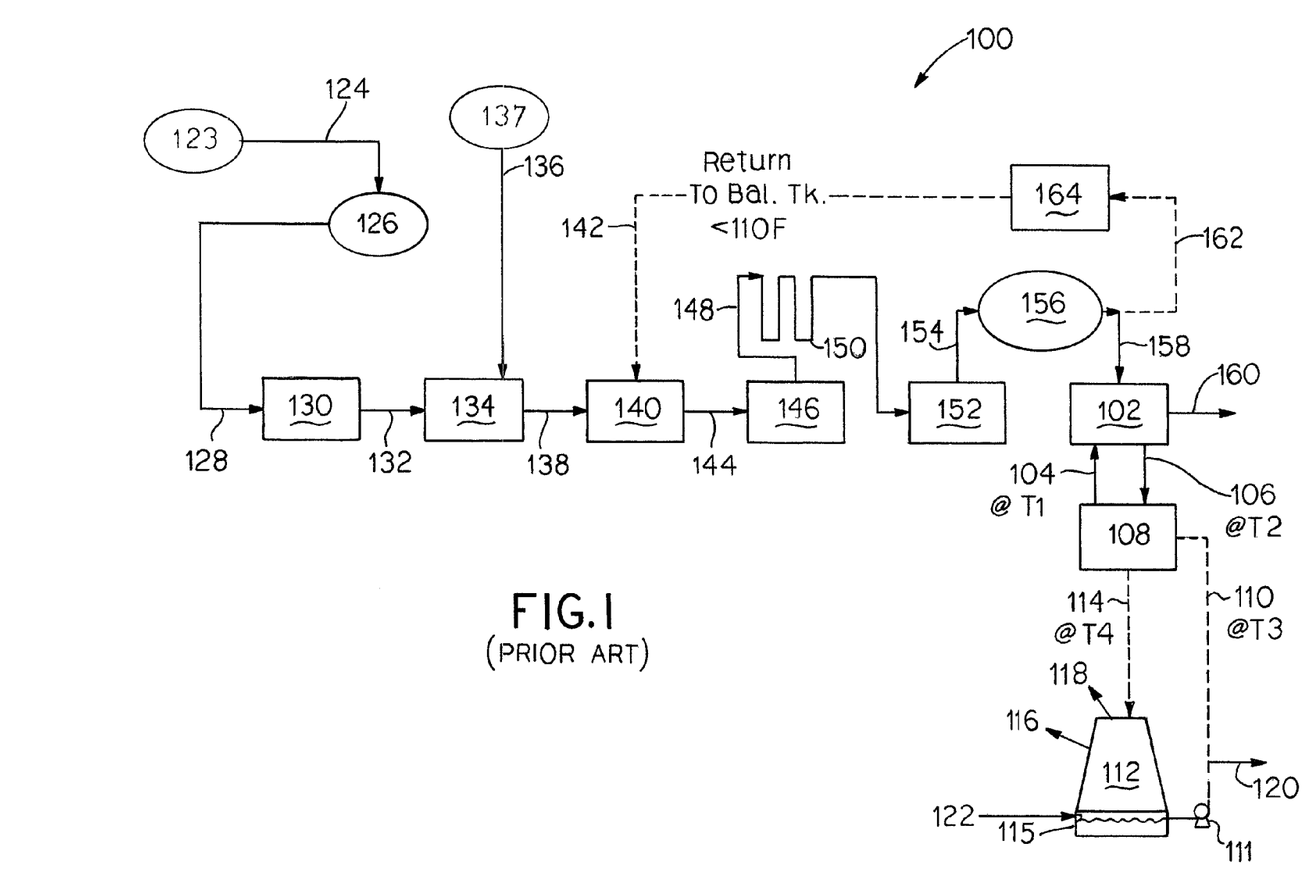
FIG. 1 is a block diagram illustrating a conventional system that includes the use of a cooling tower to provide cooling tower water for the cooling of containers containing heated beverages.

For example, filled containers made from PET or glass bottles, and or cans are typically cooled from 175°+/−25° F. ranges down to 90°+/−20° F. ranges by spraying re-circulating water over a bed of containers traveling on a moving belt. An example of a conventional system 100 having a container or bottle cooler 102 is illustrated in FIG. 1. In bottle cooler 102, the beverage containers and their contents are cooled. To obtain this cooling, a first water stream 104 having a temperature T1 (e.g., in the range of about 70° F.-95° F., such as 85° F.), is supplied to bottle cooler 102, where it is sprayed, becomes heated, and exits bottle cooler 102 as second water stream 106 having a temperature T2 that is greater than T1. For example, T2 can be in the range of about 80° F.-115° F., such as about 100° F. Second water stream 106 is then sent to heat exchanger 108, where it is cooled back to temperature T1 and exits heat exchanger 108 as first water stream 104. This cooling of second water stream 106 is accomplished at heat exchanger 108 by third water stream 110 that is supplied by cooling tower 112. Third water stream 110 enters heat exchanger 108 at a temperature T3 (e.g., 70°-94° F.), and exits as fourth water stream 114 at a temperature T4 (e.g., 75°-109° F.). These temperatures depend upon the size, content and flow rate of containers and the flow rate of spray water 104 and cooling tower water 110. In conventional practice, to make the size of the container cooler manageable, a higher temperature gradient between the container temperature and the spray water temperature is maintained. This is achieved by having high flow rates for streams 104 and 110. Please see curves "C" and "D" in FIG. 6.

In a typical cooling tower, water pumped by pump 111 from the tower basin 115 is the cooling water routed through the process coolers or heat exchangers (such as heat exchanger 108) in an industrial facility. The cool water absorbs heat from the hot process streams which need to be cooled, and the absorbed heat warms the circulating water. The warm water returns to the top of the cooling tower and trickles downward over the fill material (not shown) inside the tower. As the water trickles down, it contacts ambient air rising up through the tower either by natural draft or by forced draft using large fans (not shown) in the tower. That contact causes a small amount of the water to be lost as windage 116 and some of the water 118 to evaporate. The heat required to evaporate the water is derived from the water itself, which cools the water back to the original basin water temperature and the water is then ready to recirculate. The evaporated water leaves its dissolved salts behind in the bulk of the water which has not been evaporated, thus raising the salt concentration in the circulating cooling water. To prevent the salt concentration of the water from becoming too high, a portion of the water is drawn off for disposal (120). Fresh water makeup 122 is supplied to the tower basin 115 to compensate for the loss of evaporated water 118, the windage loss water 116, and the draw-off water 120. Chemicals may be added to the circulating water to reduce fouling and corrosion. Fresh water makeup 122 is typically water from a municipality (also called "city water").

Water source 123, for example city water, can be the source of water stream 124, which is sent to water purification unit 126, and exits water purification unit 126 as purified stream 128. Purified stream 128 is then routed to water heater 130 where it is heated (e.g., to a temperature of about 95° F.) and then sent as stream 132 to batch tank 134, where its is blended with other beverage ingredients coming into batch tank 134 as other ingredient stream 136 from ingredient source 137. Alternatively, water stream 124 can be routed first to water heater 130, and then routed to water purification unit 126, where it is then routed as stream 132 to batch tank 134. Stream 132 and stream 136 combine to form blended beverage stream 138, which exits batch tank 134 and is routed to balance tank 140. At balance tank 140, overflow stream 142 (further discussed below) is added to stream 138, and they combine to form stream 144, which exits balance tank 140, and is then sent to heater 146 where it is heated (e.g., to a temperature of about 202° to 207° F.). The heated stream exits heater 146 as stream 148. Stream 148 is routed through holding tube(s) 150 for a sufficient period of time to reduce microbial load and achieve desired shelf life. Stream 148 then exits holding tube 150 and is routed to trim cooler 152. At trim cooler 152, stream 148 is cooled and it exits trim cooler 152 as beverage stream 154 at a temperature (e.g., about 183° F.)

that is lower than the temperature of stream 148 that enters trim cooler 152 (e.g., about 202° to 207° F.).

Beverage stream 154 is then used to fill containers at fill station 156. The containers can also be capped at fill station 156. Also at fill station 156, the containers can be inverted for a brief period of time to allow for the heated beverage to sterilize the cap and the inside surface of each container that is not in direct contact with the beverage when the container is in the upright position. After the containers are inverted for a brief period of time, they are reverted back to the upright position and exit fill station 156 as hot beverage filled container stream 158. Hot beverage container stream 158 is then sent to container cooler 102, where the upright containers are placed on a belt and is cooled by spray water. Stream 104 provides water to be sprayed in container cooler 102, which cools the container and the beverages contained therein. For example the containers and the beverages they contain can enter container cooler 102 at a temperature of about 182° F., and exit as beverage filled container stream 160 at a temperature of less than about 105° F., which is a more acceptable temperature for application of labels at a labeling station (not shown).

When filling of containers must be stopped for some reason, such as a temporary mechanical failure of filling equipment, it is undesirable to shut the entire system 100 down because it would take too long a time to start the entire system 100 again and get the temperatures of the various streams back to their desired levels. To avoid a shut down of the entire system 100, a beverage stream 162 having an elevated temperature (e.g., about 182°) can be sent from fill station 156 to divert cooler 164, and then exit as stream 142 having lower temperature (e.g., less than about 110° F.). As previously discussed, stream 142 is routed to balance tank 140.

Figure 2:
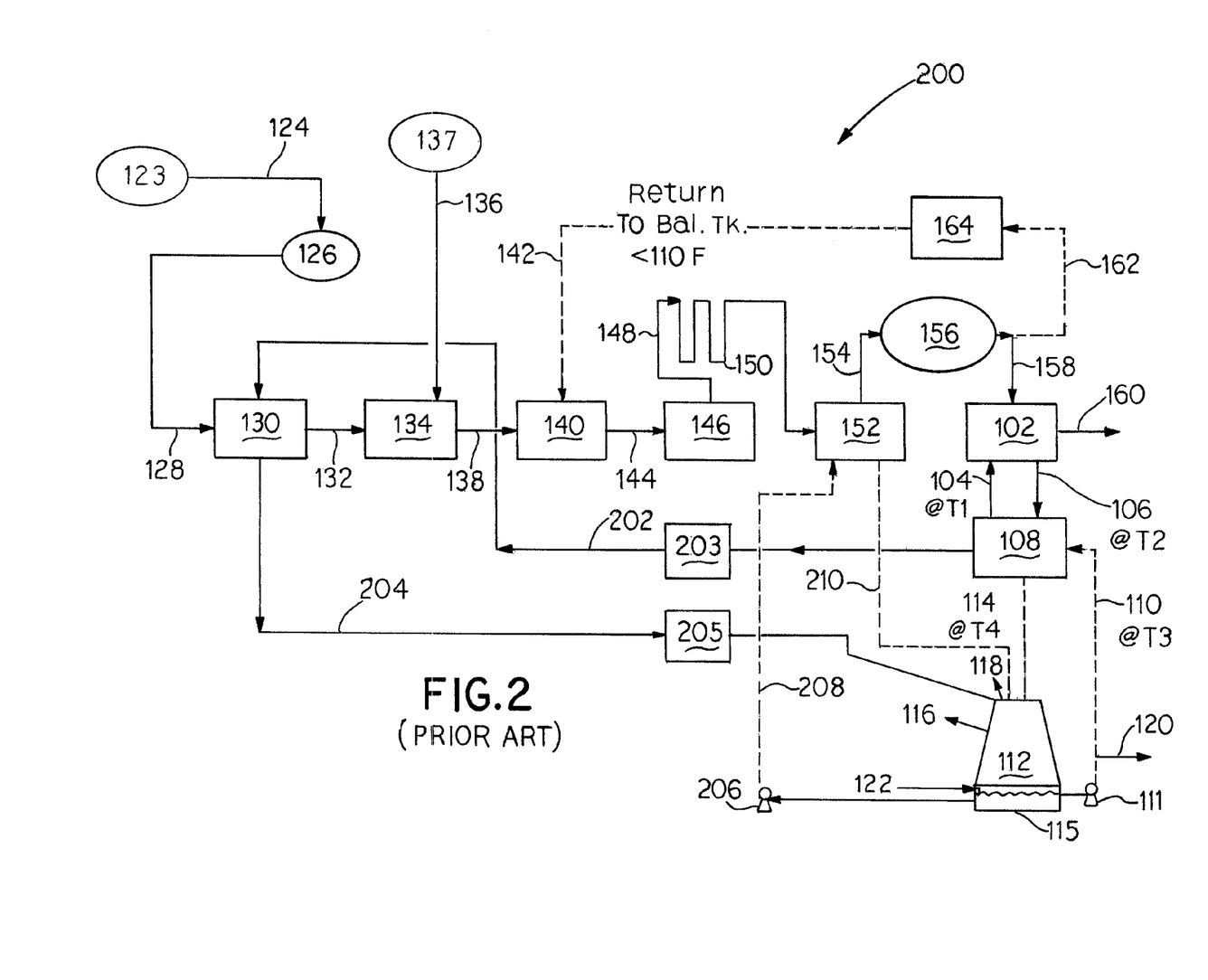
FIG. 2 is a block diagram illustrating another conventional system that includes the use of a cooling tower to provide cooling tower water for the cooling of containers containing heated beverages and using this heat to warm the incoming formulation water.

An example of another conventional system 200 is shown in FIG. 2. In system 200, instead of cooling tower water exiting heat exchanger 108 as stream 114, cooling tower water exits heat exchanger 108 as stream 202. Stream 202 can be maintained in hot water surge tank 203, from which it is routed to water heater 130, where it is used to heat stream 128. Stream 202 exits water heater 130 as stream 204, which has a lower temperature than stream 202. Stream 204 can be maintained in cold water storage tank 205, from which it can be routed back to cooling tower 112 for further cooling. Pump 206 can be used to pump stream 208 from basin 115 to trim cooler 152 to cool stream 148 so that it exits trim cooler 152 as stream 154 having a lower temperature than stream 148. Stream 208 becomes warmer in trim cooler 152, and exits trim cooler 152 as stream 210. Stream 210 is then routed back to cooling tower 112 for cooling. In addition, another pump (not shown) can be used to pump a stream of cooling tower water from basin 115 to divert cooler 164 to pick up heat from stream 162, and then be routed back to cooling tower 112 for cooling, and in this process stream 162 is cooled and exits divert cooler 164 as stream 142.

In a typical container cooler, water is sprayed by a series of consecutive spray heads, wherein stream 104 enters container cooler 102 at an end opposite the end where the containers enter container cooler 102. In a conventional system 100 or 200, streams 104 and 106 have a flow rate in the range of about 800-1,200 gallons/minute (e.g., 874 gallons/minute), and the temperature difference between stream 104 and 106 is kept low in the range of 10 to 15° F. (e.g., stream 104 can have a temperature of 88° F., and stream 106 can have a temperature of about 98° F.).

Conventional systems employ high spray water flow and low temperature rise in the spray water. This correspondingly maintains a large temperature gradient between the container fluid temperature and the spray water temperature. The low spray water discharge temperature limits the amount of heat that can be recovered and used in upstream heating processes, and non-recovered heat is released to the atmosphere at the cooling tower.

BRIEF SUMMARY OF THE INVENTION

The present invention provides a process that substantially reduces or eliminates the need for a cooling tower to provide a cooled water stream to cool heated products and the containers holding such heated products. Consequently, the present invention conserves energy and water lost by windage, evaporation and blow-off. The product, by way of example but not limitation, can be a food product, such as a beverage.

In accordance with a first aspect of the invention, a system is provided that recovers heat from heat transfer fluid (such as water by way of example but not limitation) at a container cooler, and supplies the recovered heat to a product stream (such as a beverage stream by way of example but not limitation) at a pre-heater located downstream of where the product stream is formed and upstream of a heater that heats the product stream to a desired temperature.

In accordance with a second aspect of the invention, a method is provided comprising the steps of forming a product, pre-heating the product to a first temperature using a first heat transfer stream, heating the product to a second temperature, placing the heated product in a container, sending the container through a container cooler, transferring heat from the container to a second heat transfer stream in the container cooler, and transferring heat from the heated second heat transfer stream to the first heat transfer stream.

It will be appreciated by those skilled in the art that the system and methods disclosed here can be particularly suitable for the cooling of beverages and their respective containers after such beverages. Thus, the systems and methods disclosed here can be used in the reduction or elimination of undesirable reactions, such as chemical reaction, biochemical reaction, enzymatic reaction, and microbial reaction, and any combination thereof. By way of example, but not limitation, the systems and methods disclosed here can be used to reduce microbial load and the reactions or effects due to such microbial load and achieve desired shelf life.

These and other aspects, features and advantages of the invention or of certain embodiments of the invention will be further understood by those skilled in the art from the following description of exemplary embodiments.

DETAILED DESCRIPTION OF THE INVENTION

Those of ordinary skill in the art will understand that the methods and systems disclosed here can be used to cool any heated food product(s), and the container holding such heated food product. Such food product can be a beverage, sauce, gravy, puree and similar products. Such beverages can include, e.g. ready to drink liquid formulations (including formulations that are to be later frozen), beverage concentrates and the like. Such beverages can include, e.g., carbonated and non-carbonated soft drinks, fountain beverages, coffee beverages, tea beverages, dairy beverages, powdered soft drinks, as well as liquid concentrates, flavored waters, enhanced waters, fruit juice and fruit juice-flavored drinks, sport drinks, and alcoholic products. Containers for the food product can be any suitable container, including but not limited to bottles and cans. Containers for the food product can comprise any suitable material including but not limited to glass, polyethylene terephthalate (PET), and aluminum.

In one embodiment, a system or apparatus can comprise a pre-heater located downstream of where a food product stream is formed and upstream of a heater that heats the food product stream to a desired temperature, and a circulating stream of a first heat transfer stream that pre-heats the food product at the pre-heater. The system can comprise a container cooler and circulating stream of a second heat transfer stream that cools containers containing the heated food product coming out of the heater. The system can comprise a heat exchanger where heat from the second heat transfer stream is transferred to the first heat transfer stream.

In one embodiment a food product is formed in a batch tank and/or a balance tank prior to being pre-heated at the pre-heater by the first heat transfer stream.

In a preferred embodiment, the heater heats the food product to a temperature sufficient to reduce microbial load in the food product.

The system can comprise a filling station where the heated food product is placed into containers upstream of the container cooler.

Figure 3A:
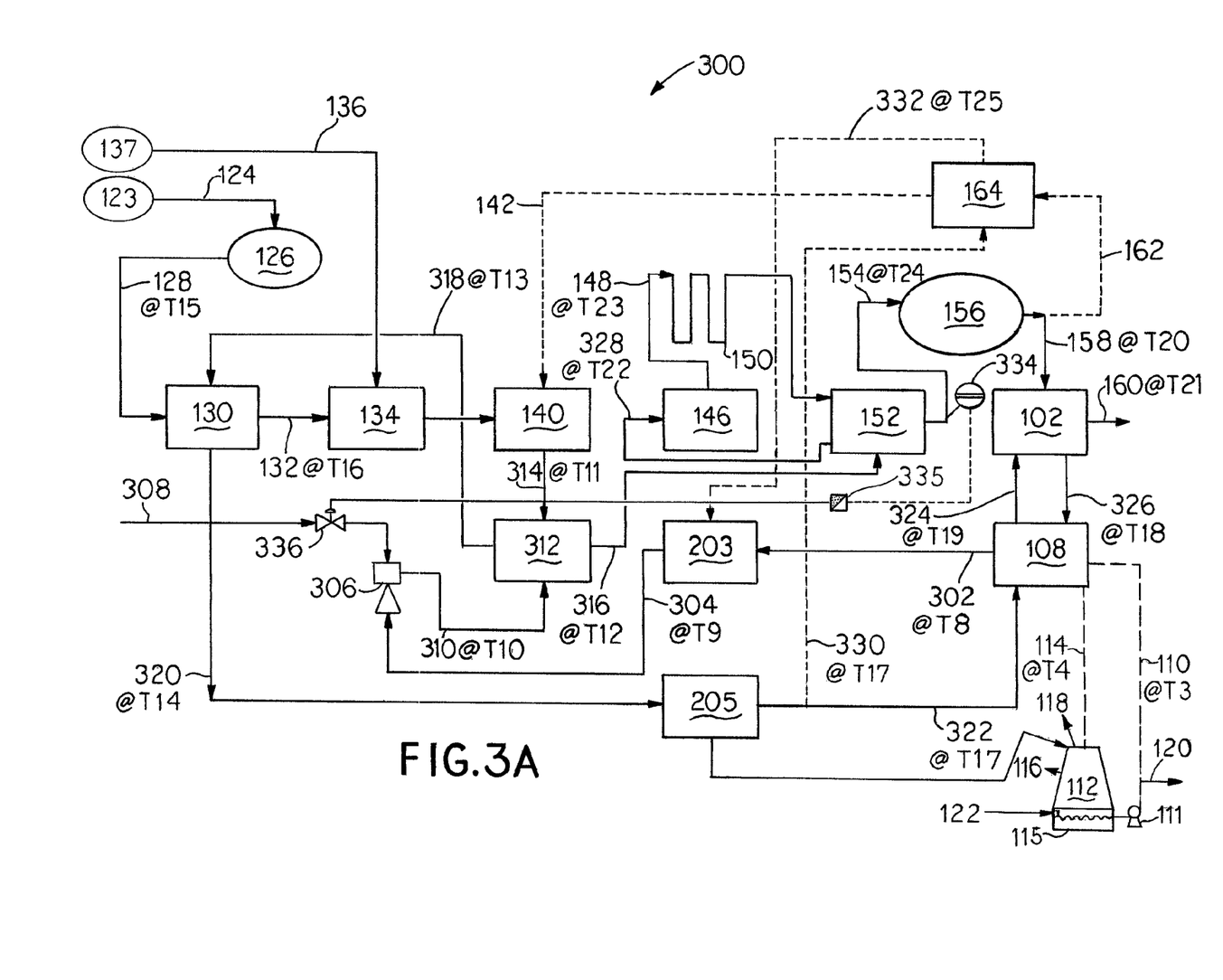
FIG. 3A is a block diagram illustrating an embodiment of the present invention wherein heat is recovered in the cooling of containers containing heated beverages, and the recovered heat is used in at least one upstream heating process, and wherein load on the cooling tower is reduced or eliminated.
Figure 3B:
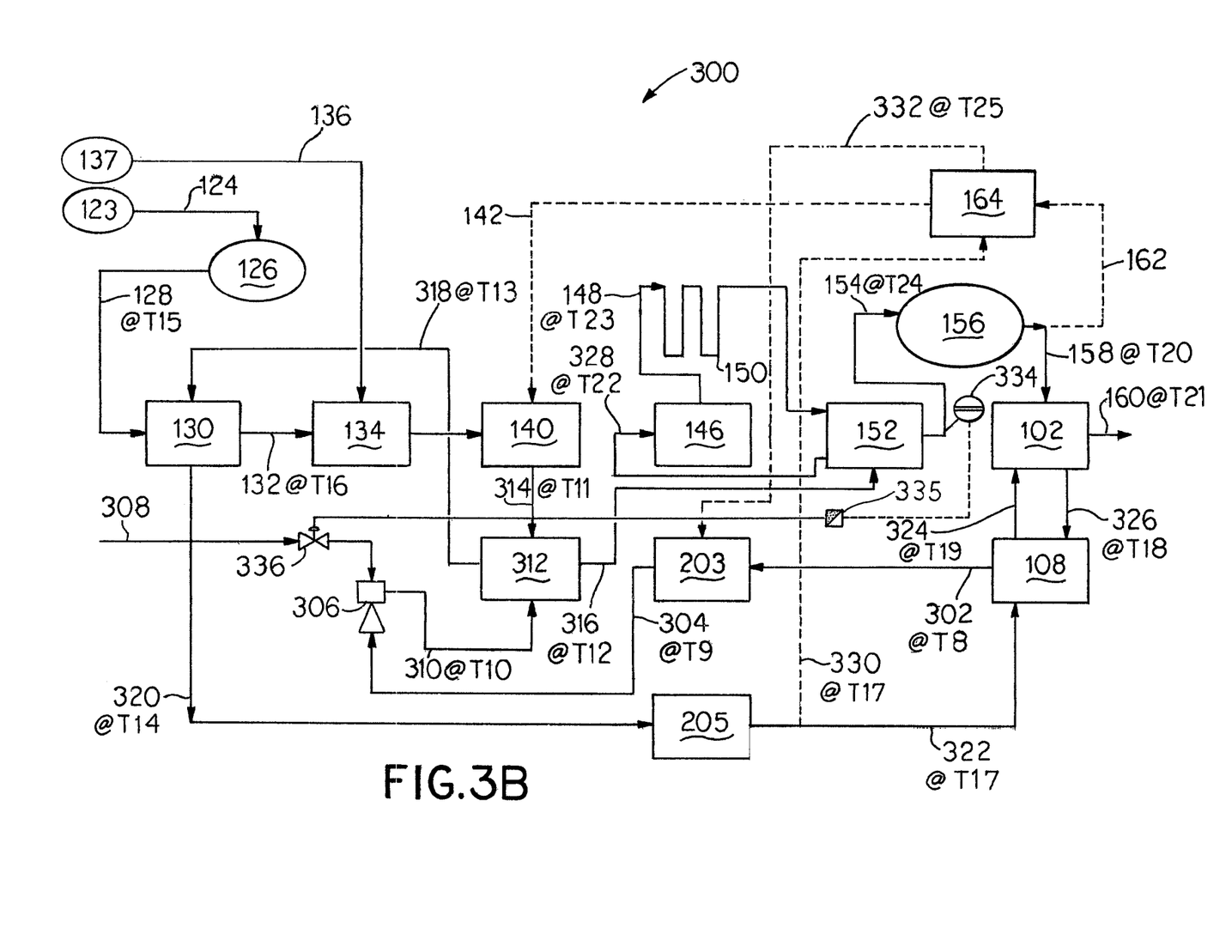
FIG. 3B illustrates the embodiment of FIG. 3A wherein the cooling tower has been eliminated.

An exemplary embodiment in accordance with the present invention is depicted as system 300 in FIG. 3A. In system 300, the load on cooling tower 112 has been greatly reduced or eliminated. FIG. 3B illustrates the embodiment of FIG. 3A wherein the cooling tower has been eliminated. All of the heat transfer streams described herein can comprise any suitable heat transfer fluid, including but not limited to water. System 300 can comprise a first heat transfer stream 302 exiting heat exchanger 108 having a temperature T8 (e.g., 120°-160° F.). This higher temperature is achieved by reducing the flow rate of spray water, stream 324. Stream 302 can be sent to hot surge tank 203, and exit as stream 304 having a temperature T9 (e.g., 120°-160° F.). Stream 304 can be sent to steam injector 306, (or any other indirect heat exchanger, such as shell and tube, plate, etc.) where it can be heated by steam stream 308, and exit as hot heat transfer stream 310 having a temperature T10 (e.g., 185° F.). Heat transfer stream 310 can be sent to pre-heater 312, where it can pre-heat food product stream 314 from a temperature T11 (e.g., 80°-110° F.) to a temperature T12 (e.g., 175° F.), so that the pre-heated food product exits pre-heater 312 as pre-heated food product stream 316. Hot water stream 310 exits pre-heater 312 as stream 318 having a temperature T13 (e.g., 100° F.). Stream 318 is sent to water heater 130, where it exits as stream 320 having a temperature T14 (e.g., 45°-100° F.). At water heater 130, stream 318 heats feed stream 128 having a temperature T15 (e.g., 35°-90° F.). Feed stream 128 exits water heater 130 as feed stream 132 having a temperature T16 (e.g., 95° F.). The excess water can be returned to the boiler, as condensate for an indirect heater or purge for a direct heater, based on system size and economics.

Stream 320 can be routed to a cold surge tank 205, where it exits as stream 322 having a temperature T17 (e.g., 450-100° F.). Stream 322 can be routed to heat exchanger 108, and the process is repeated. Depending on system sizes, the excess unrecovered heat is rejected at the cooling tower as in conventional practice. Hence, the load on the cooling tower is reduced by something greater than 0% and up to 100%, typically 50% to 100%.

Heat transfer stream 326 having a temperature T18 (e.g., 125°-165° F.) enters heat exchanger 108, and exits as heat transfer stream 324 having a temperature T19 (e.g., 45°-90° F.). Stream 322 cools heat transfer stream 326 so that heat transfer stream 326 exits as stream 324. Stream 324 enters container cooler 102, where it cools containers containing a heated beverage, and stream 324 exits container cooler 102 as stream 326. Containers containing heated food products enter container cooler 102 as stream 158 at a temperature T20 (e.g., about 182° F.) and exit at as stream 160 at a temperature T21 (e.g., less than about 105° F.).

Stream 316, having a temperature T12 (e.g., about 175° F.) can enter trim cooler 152 and exit trim cooler as stream 328 having a temperature T22 (e.g., 195° F.). In trim cooler 152, stream 316 picks up heat from stream 148 having a temperature T23 (e.g., about 202° to 207° F.), and cools stream 148 so that it exits trim cooler as stream 154 having a temperature T24 (e.g., about 185° F.). Streams 316 and 148 have the same flow rate, and hence temperature drop in one is equal to rise in the other.

Stream 154 can then be used to fill containers at fill station 156, capped and briefly inverted and then reverted to the upright position, as previously described. The containers containing heated food products can then be sent as stream 158 to container cooler 102 for cooling.

When filling of containers must be stopped for some reason, such as a temporary mechanical failure of filling equipment, it is undesirable to shut the entire system 300 down because it would take too long a time to start the entire system 300 again and get the temperatures of the various streams back to their desired levels. To avoid a shut down of the entire system 300, beverage stream 162 having an elevated temperature (e.g., about 182°) can be sent from fill station 156 to divert cooler 164, and then exit as stream 142 having lower temperature (e.g., less than about 110° F.). As previously discussed, stream 142 can be routed to balance tank 140. Stream 330 having a temperature T17 (e.g., 45°-100° F.), can be sent from cold water surge tank 205 to divert cooler 164 to cool stream 162. Stream 330 picks up heat from stream 162, and stream 330 exits divert cooler as stream 332 having a temperature T25 (e.g., 140° F.). Stream 332 can be routed to hot water surge tank 203. A temperature indicator control ("TIC") 334 can monitor the temperature T24 of stream 154 exiting trim cooler 152, and if T24 becomes higher than the desired temperature, then TIC 334 can send a signal in order to reduce or shut off, via valve 336, steam stream 308 being added to stream 304 at steam injector 306. For example, TIC 334 can send an electrical signal to electrical pneumatic signal converter 335, and electrical pneumatic signal converter 335 can then convert the electrical signal from TIC 334 to a pneumatic control signal to pneumatically control valve 336.

EXAMPLE 1

Figure 4:
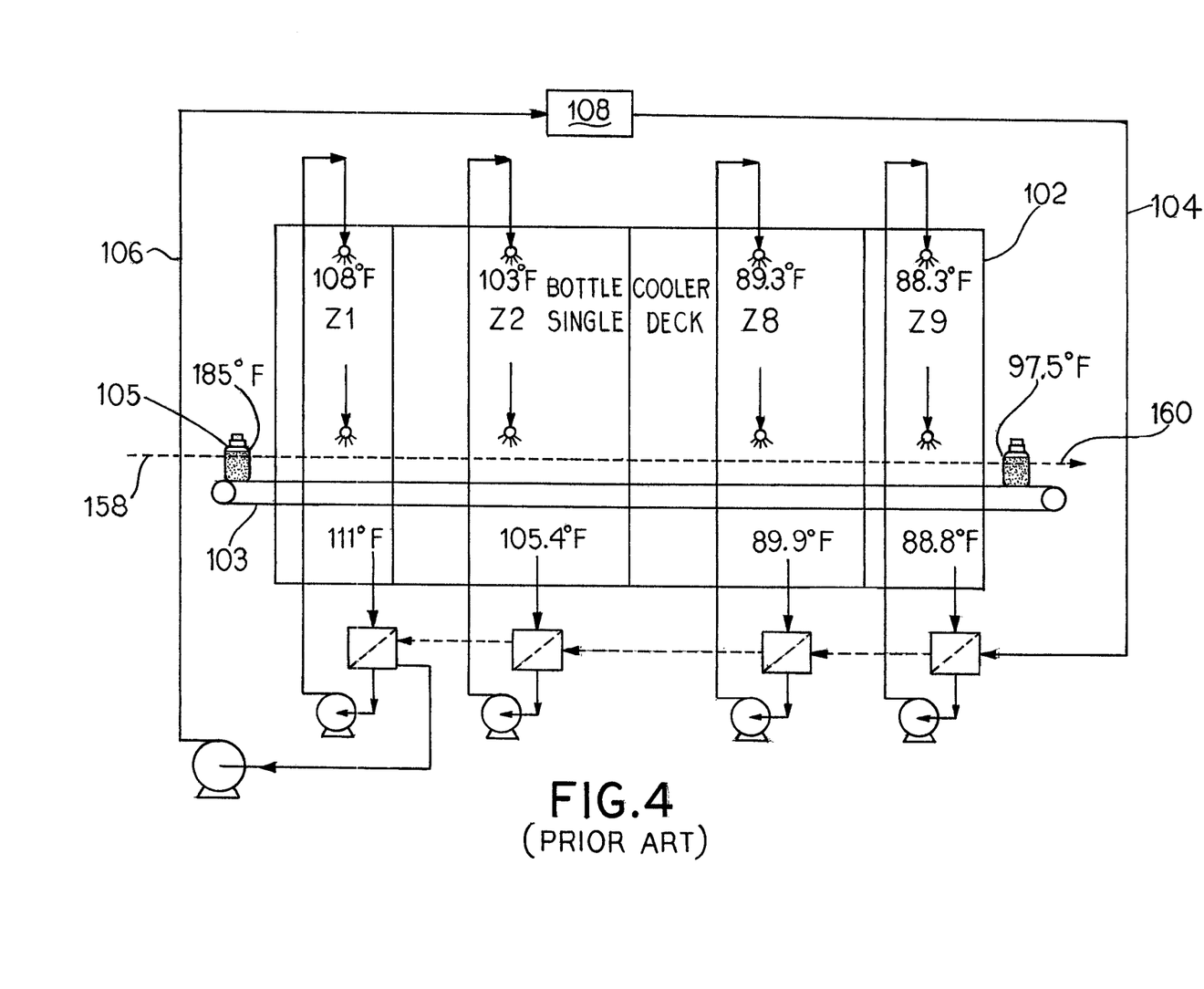
FIG. 4 is a diagram illustrating flow temperatures of a heat transfer fluid through a container cooler in accordance with a prior art system as shown in FIGS. 1 or 2.

FIG. 4 depicts the flow rates and temperatures calculated for a nine zone container cooler, with only zones 1, 2, 8, and 9 (zones Z1 through Z9) in a conventional system 100 or 200 as shown in FIGS. 1 or 2. Stream 158 comprising bottles 105 containing a beverage having a temperature of 185° F. is shown entering container cooler 102, and exiting container cooler 102 as stream 160 comprising bottles 105 containing the beverage having a temperature of 97.5° F.

Table 1 depicts calculated parameters with respect to a counter current container cooler or bottle cooler 102, when a conventional system as illustrated in FIG. 1 or FIG. 2 is used. In this example, counter current bottle cooler 102 has nine (9) zones numbered Z1 through Z9. At zone 1, the heated and bottled beverages enter the counter current bottle container cooler 102, and are moved by a belt through the successive numbered zones, until the bottled beverages exit zone 9. At zone 9, the first water stream 104 depicted in FIG. 1 or FIG. 2 enters current bottle container cooler 102, where it is sprayed over bottled beverages moving through zone 9, is then collected at the bottom of zone 9 and then routed to zone 8 where sprayed over bottled beverages moving through zone 8, etc., until the water stream exits bottle cooler 102 as second water stream 106 depicted in FIG. 1 or FIG. 2.

TABLE 1

|  |  | Z1 | Z2 | Z3 | Z4 | Z5 | Z6 | Z7 | Z8 | Z9 |
| --- | --- | --- | --- | --- | --- | --- | --- | --- | --- | --- |
| Volume/bottle | Oz/bottle | 20 | 20 | 20 | 20 | 20 | 20 | 20 | 20 | 20 |
| Bottle feed rate/min | BPM | 1,200 | 1,200 | 1,200 | 1,200 | 1,200 | 1,200 | 1,200 | 1,200 | 1,200 |
| Temp. of beverage in | ° F. | 185.0 | 163.0 | 146.0 | 133.0 | 122.5 | 114.5 | 108.0 | 103.0 | 99.0 |
| Temp. of beverage out | ° F. | 163.0 | 146.0 | 133.0 | 122.5 | 114.5 | 108.0 | 103.0 | 99.9 | 97.5 |
| Vol. Flow rate of beverage | GPM | 187.5 | 187.5 | 187.5 | 187.5 | 187.5 | 187.5 | 187.5 | 187.5 | 187.5 |
| Heat removed per zone | Thousand BTU/hr | 2,196 | 1,697 | 1297 | 1048 | 798 | 649 | 499 | 399 | 150 |
| Time of each bottle per zone | Minutes | 1.95 | 1.92 | 1.92 | 1.92 | 1.92 | 1.92 | 1.92 | 1.92 | 0.90 |
| Temp. of coolant in | ° F. | 108.0 | 103.0 | 99.1 | 96.1 | 93.71 | 91.9 | 90.4 | 89.3 | 88.3 |
| Temp. of coolant out | ° F. | 111.1 | 105.4 | 101.0 | 97.6 | 94.9 | 92.8 | 91.1 | 89.9 | 88.8 |
| Temp. diff at inlet b/t beverage in and coolant out | ° F. | 74 | 58 | 45 | 35 | 28 | 22 | 17 | 13 | 10 |
| Temp. diff at outlet b/t beverage out and coolant in | ° F. | 55 | 43 | 34 | 26 | 21 | 16 | 13 | 10 | 9 |
| Log mean temp. diff | ° F. | 64 | 50 | 39 | 31 | 24 | 19 | 15 | 11 | 10 |
| Coolant flow rate as sprayed | Thousand GPM | 1,395 | 1,371 | 1,371 | 1,371 | 1,371 | 1,371 | 1,371 | 1,371 | 648 |
| Retainer flow rate of coolant stream 106 through exchanger 108 | GPM | 874 | 874 | 874 | 874 | 874 | 874 | 874 | 874 | 874 |
| Heat carried by coolant stream 106 | Thousand BTU/hr | 2,196 | 1,697 | 1,297 | 1,048 | 798 | 649 | 499 | 399 | 150 |
| Temp. in reservoir that corresponds to the zone, prior to spraying | ° F. | 108.0 | 103.0 | 99.1 | 96.1 | 93.7 | 91.9 | 90.4 | 89.3 | 88.3 |

The temperature T1 of stream 104 to the reservoir in Z9 in the above example was set to be about 88° F.

EXAMPLE 2

Figure 5:
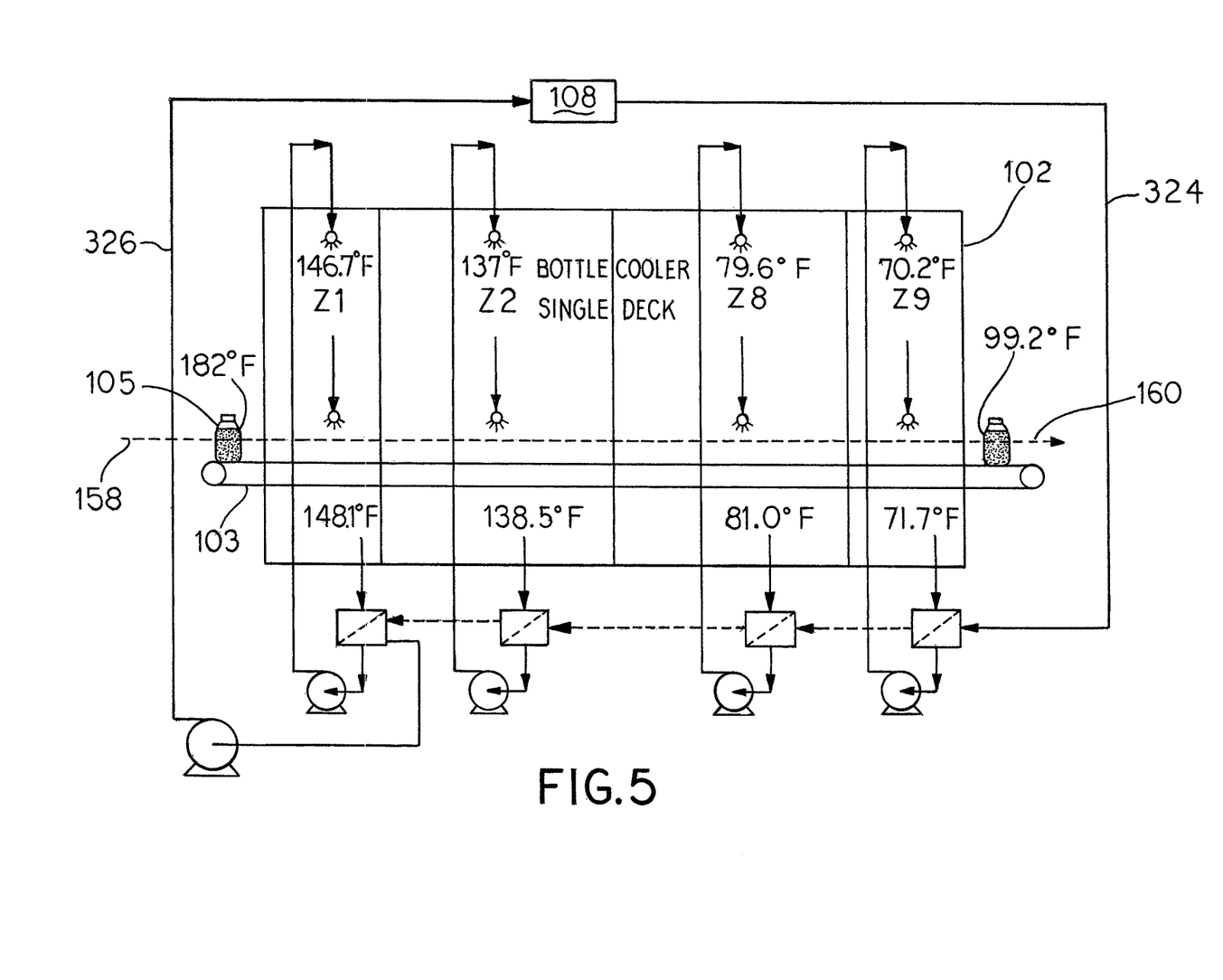
FIG. 5 is a diagram illustrating flow temperatures of a heat transfer fluid through a container cooler in accordance with an embodiment of the present invention as shown in FIG. 3A.

FIG. 5 depicts the flow rates and temperatures calculated for a nine zone container cooler, with only zones 1, 2, 8, and 9 (zones Z1 through Z9) depicted in a system 300 as shown in FIG. 3A.

Table 2 depicts calculated parameters with respect to a counter current container cooler or bottle cooler 102, when a system 300 is used as illustrated in FIG. 3A. In this example, counter current bottle cooler 102 has nine (9) zones numbered Z1 through Z9. At zone 1, the heated and bottled beverages enter the counter current bottle container cooler 102, and are moved by a belt through the successive numbered zones, until the bottled beverages exit zone 9. At zone 9, the stream 324 depicted in FIG. 3A enters current bottle container cooler 102, where it is sprayed over bottled beverages moving through zone 9, is then collected at the bottom of zone 9 and then routed to zone 8 where sprayed over bottled beverages moving through zone 8, etc., until the water stream exits bottle cooler 102 as stream 326 depicted in FIG. 3A.

TABLE 2

|  |  | Z1 | Z2 | Z3 | Z4 | Z5 | Z6 | Z7 | Z8 | Z9 |
| --- | --- | --- | --- | --- | --- | --- | --- | --- | --- | --- |
| Volume/bottle | Oz/bottle | 20 | 20 | 20 | 20 | 20 | 20 | 20 | 20 | 20 |
| Bottle feed rate/min | BPM | 1,200 | 1,200 | 1,200 | 1,200 | 1,200 | 1,200 | 1,200 | 1,200 | 1,200 |
| Temp. of beverage in | °F. | 182.0 | 172.2 | 162.5 | 152.5 | 143.1 | 133.4 | 124.0 | 114.0 | 104.4 |
| Temp. of beverage out | °F. | 172.2 | 162.5 | 152.5 | 143.1 | 133.4 | 124.0 | 114.0 | 104.4 | 99.2 |
| Vol. Flow rate of beverage | GPM | 187.5 | 187.5 | 187.5 | 187.5 | 187.5 | 187.5 | 187.5 | 187.5 | 187.5 |
| Heat removed per zone | Thousand BTU/hr | 978 | 964 | 1,001 | 937 | 974 | 936 | 997 | 959 | 523 |
| Time of each bottle per zone | Minutes | 1.95 | 1.92 | 1.92 | 1.92 | 1.92 | 1.92 | 1.92 | 1.92 | 0.96 |
| Temp. of coolant in | °F. | 146.7 | 137.0 | 127.5 | 117.6 | 108.4 | 98.7 | 89.5 | 79.6 | 70.2 |
| Temp. of coolant out | °F. | 148.1 | 138.5 | 129.0 | 119.0 | 109.8 | 100.1 | 91.0 | 81.0 | 71.7 |
| Temp. diff at inlet b/t beverage in and coolant out | °F. | 34 | 34 | 34 | 34 | 33 | 33 | 33 | 33 | 33 |
| Temp. diff at outlet b/t beverage out and coolant in | °F. | 26 | 26 | 25 | 26 | 25 | 25 | 25 | 25 | 29 |
| Log mean temp. diff | °F. | 29 | 29 | 29 | 29 | 29 | 29 | 29 | 29 | 31 |
| Coolant flow rate as sprayed | Thousand GPM | 1,395 | 1,371 | 1,371 | 1,371 | 1.371 | 1,371 | 1,371 | 1,371 | 690 |
| Retainer flow rate of coolant stream 326 through exchanger 108 | GPM | 203 | 203 | 203 | 203 | 203 | 203 | 203 | 203 | 203 |
| Heat carried by coolant stream 326 | Thousand BTU/hr | 978 | 964 | 1,001 | 937 | 974 | 936 | 997 | 959 | 523 |
| Temp. in reservoir that corresponds to the zone, prior to spraying | °F. | 146.7 | 137.0 | 127.5 | 117.6 | 108.4 | 98.7 | 89.5 | 79.6 | 70.2 |

The temperature T19 of stream 324 to the reservoir in Z9 can be about 65° F.

Figure 6:
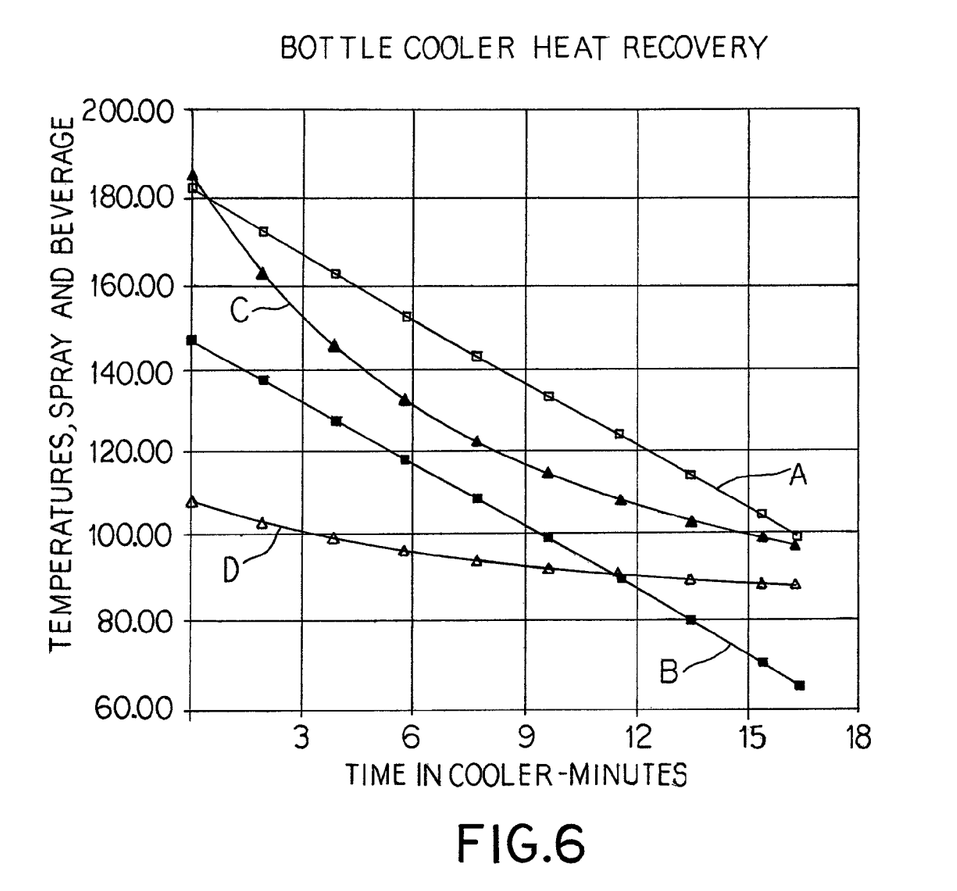
FIG. 6 is a graph that illustrates temperature profiles in a prior art system as shown in FIGS. 1 or 2 as compared with that in an embodiment of the present invention as shown in FIG. 3A.

FIG. 6 is a graph that illustrates certain temperature profiles set forth in Tables 1 and 2. Line A in FIG. 6 illustrates the temperature of the beverage in the containers going into each zone Z1 through Z9, and exiting Z9 as bottled stream 160 in the system 300 depicted in FIG. 3A. Line C in FIG. 6 illustrates the temperature of the beverage in the containers going into each zone Z1 through Z9, and exiting Z9 as bottled stream 160 in the system 100 or 200 depicted in FIGS. 1 or 2. Line B in FIG. 6 illustrates the temperature of the coolant stream sprayed in each zone Z1 through Z9, and exiting Z1 as stream 326 in the system 300 depicted in FIG. 3A. Line D in FIG. 6 illustrates the temperature of the coolant stream sprayed in each zone Z1 through Z9, and exiting Z1 as stream 106 in the system 100 or 200 depicted in FIGS. 1 or 2.

As shown by lines A and B calculated for a system 300 in accordance with the present invention, a consistent temperature difference through each zone can be achieved between the beverage being cooled, and the spray water that cools the beverage. As also shown, use of system 300 can also result in a high temperature T18 of stream 326 (e.g., 148.1° F.) that can be used to effectively heat other process streams.

As shown by lines C and D calculated for a system 100 or 200 in accordance with conventional set-up as shown in FIGS. 1 and 2, a consistent temperature difference through each zone is not achieved between the beverage being cooled, and the spray water that cools the beverage. As also shown, use of a conventional system 100 or 200 results in a temperature T2 of stream 106 (e.g., 111° F.) that cannot be used as effectively to heat other process streams as can T18 of stream 326 in accordance with the system shown in FIG. 3A.

Systems and methods in accordance with the invention disclosed herein use low retainer/sump over flow from zone to zone within the cooler and through the external heat exchanger resulting in high temperature rise in the retainer water flow going thru the external heat exchanger. This correspondingly maintains a lower temperature gradient between the container fluid temperature and the spray water temperature. However this feature of lower temperature gradient is compensated by lower "coolant media" in this case "process water and/or beverage blend at ~70° F., versus cooling tower water in current practice limited to 85 to 95° F., as design values. The cooling tower water temperature is dictated by geographic location, weather and the maximum wet bulb temperature at the site. The heat transfer reduction due to lower temperature gradient may be further compensated with larger heat transfer area, higher heat transfer coefficient, and or by increasing usable cooler bed area and residence time for the containers undergoing cooling. Hence, the high spray water discharge temperature allows much greater amount of heat that can be recovered and re-used for the heating of the formulation water or beverage blend. Since the recovered heat can now be re-used in heating the formulation water or finished product, this heat is not rejected at the cooling tower. This has the added benefit of conserving water lost due to windage, evaporation and blow-off.

An opportunity to conserve energy and water is illustrated and described herein. This opportunity is supported by application of basic tenets of Chemical Engineering, principally unsteady-state Heat Transfer through a solid body—i.e., beverage in a bottle as a cylinder. Mathematical modeling to simulate multi-zone, forced convection, counter current cooler, to conserve energy and water is also described herein. In a modern high speed line, 28 to 50 B BTU of energy can be conserved per year. Simultaneously, 2.6 to 4.7 M Gallons of water, otherwise lost to atmosphere can also be conserved in a modern high speed line. Extending this concept across an installed manufacturing base, can conserve many more BTU of energy and gallons of water per year. Since fossil fuels are a primary source of this energy and water purification and delivery systems, their burning is eliminated.

The systems and methods disclosed herein can be used for water and energy conservation in systems that require heating of a liquid for process considerations, such as a chemical, biochemical, enzymatic and or microbial reaction, filling the liquid in a container and subsequently cooling the filled container to a lower temperature for label application, storage or any other purpose. The systems and methods disclosed herein can be used to achieve a desired temperature sufficiently high to reduce an undesirable reaction in the food product selected from the group consisting of chemical reaction, biochemical reaction, enzymatic reaction, and microbial reaction, and any combinations thereof. The heated liquid may be a food product, including, but not limited to, heated beverages that are placed in containers. While the embodiments illustrated in the Figures are for cooling of beverage containers containing heated beverages, the disclosure herein encompasses systems for cooling of containers containing heated non-beverages and similar processes.

Embodiments of the Invention

Embodiments of the invention include, but are not limited to, the following.

Embodiment 1—A system or apparatus comprising a chamber where a product stream is formed, a pre-heater located downstream of the chamber and upstream of a heater that heats the product stream to a desired temperature, the pre-heater comprising a circulating stream of a first heat transfer stream that pre-heats the food product, a container cooler comprising a circulating stream of a second heat transfer stream that cools containers containing the heated product coming out of the heater, and a heat exchanger where heat from the second heat transfer stream is transferred to the first heat transfer stream. The chamber can be any suitable structure wherein a product can be formed, including but not limited to a tank, a vessel, a nozzle, and/or a pipe. The product can be a food product.

Embodiment 2—same as Embodiment 1, wherein the desired temperature is sufficiently high to reduce an undesirable reaction in the product selected from the group consisting of chemical reaction, biochemical reaction, enzymatic reaction, and microbial reaction, and any combination thereof.

Embodiment 3—same as Embodiment 2, wherein the undesirable reaction that is reduced is microbial reaction.

Embodiment 4—same as Embodiment 1, wherein the product is a beverage.

Embodiment 5—same as Embodiment 2, wherein the product is a beverage.

Embodiment 6—same as Embodiment 1, wherein the first heat transfer stream is heated by steam prior to being routed to the pre-heater.

Embodiment 7—same as Embodiment 1, wherein after the first heat transfer stream pre-heats the product stream, the first heat transfer stream is further cooled by the product or its constituents at a location between the pre-heater and the heat exchanger where heat from the second heat transfer stream is transferred to the first heat transfer stream.

Embodiment 8—same as Embodiment 7, wherein the product is a beverage.

Embodiment 9—same as Embodiment 6 or Embodiment 7, wherein the desired temperature is sufficiently high to reduce an undesirable reaction in the product selected from the group consisting of chemical reaction, biochemical reaction, enzymatic reaction, and microbial reaction, and any combination thereof.

Embodiment 10—same as Embodiment 9, wherein the undesirable reaction that is reduced is microbial reaction.

Embodiment 11—same as Embodiment 9, wherein the product is a beverage.

Embodiment 12—A method comprising the steps of: a) forming a product; b) pre-heating the product to a first temperature using a first heat transfer stream after step a), c) heating the product to a second temperature, d) placing the heated product in a container, e) sending the container containing the heated product through a container cooler, f) transferring heat from the container to a second heat transfer stream in the container cooler, and g) transferring heat from the heated second heat transfer stream to the first heat transfer stream.

Embodiment 13—same as Embodiment 12, wherein the product is a food product.

Embodiment 14—same as Embodiment 12, wherein the second temperature is sufficiently high to reduce an undesirable reaction in the product selected from the group consisting of chemical reaction, biochemical reaction, enzymatic reaction, and microbial reaction, and any combination thereof.

Embodiment 15—same as Embodiment 14, wherein the undesirable reaction that is reduced is microbial reaction.

Embodiment 16—same as Embodiment 13, wherein the food product is a beverage.

Embodiment 17—same as Embodiment 14, wherein the product is a food product.

Embodiment 18—same as Embodiment 17, wherein the food product is a beverage.

Embodiment 19—same as Embodiment 12, further comprising the step of heating the first heat transfer stream by steam prior to being routed to the pre-heater.

Embodiment 20—same as Embodiment 12, wherein after the first heat transfer stream pre-heats the product, the first heat transfer stream is further cooled by the product or its constituents at a location between the pre-heater and the heat exchanger where heat from the second heat transfer stream is transferred to the first heat transfer stream.

Embodiment 21-same as Embodiment 20, wherein the product is a food product.

Embodiment 22-same as Embodiment 21, wherein the food product is a beverage.

Embodiment 23-same as Embodiment 20, wherein the second temperature is sufficiently high to reduce an undesirable reaction in the product selected from the group consisting of chemical reaction, biochemical reaction, enzymatic reaction, and microbial reaction, and any combination thereof.

Embodiment 24-same as Embodiment 23, wherein the undesirable reaction that is reduced is microbial reaction.

Embodiment 25-same as Embodiment 23, wherein the product is a food product.

Embodiment 26-same as Embodiment 25, wherein the food product is a beverage.

Given the benefits of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

We claim:

1. An apparatus comprising:
a chamber where a product stream is formed;
a product stream conduit, the product stream conduit located downstream of the chamber and configured to receive the product stream from the chamber;
a heater, the heater located downstream of the chamber and configured to heat the product stream in the product stream conduit to a desired temperature;
a conduit loop comprising a first circulating heat transfer stream;
a pre-heater wherein heat from the conduit loop comprising the first circulating heat transfer stream pre-heats the product stream in the product stream conduit, the pre-heater located downstream of the chamber and upstream of the heater;
a holding tube, the holding tube located downstream of the heater and configured to receive the product stream from the heater and maintain the product stream in the holding tube for a predetermined period of time;
a fill station, the fill station configured to receive the product stream from the holding tube and fill a plurality of containers with the product stream;
a circulating stream comprising a second circulating heat transfer stream;
a container cooler located downstream of the heater; the second circulating heat transfer stream configured to cool the containers in the container cooler;
a heat exchanger wherein heat from the second circulating heat transfer stream is transferred to the first circulating heat transfer stream of the conduit loop,
the conduit loop comprising the first circulating heat transfer stream separate and distinct from the second circulating heat transfer stream.

2. The apparatus of claim 1, wherein the desired temperature is Sufficiently high to reduce an undesirable reaction in the product selected from the group consisting of chemical reaction, biochemical reaction, enzymatic reaction, and microbial reaction, and any combination thereof.

3. The apparatus of claim 2, wherein the undesirable reaction that is reduced is microbial reaction.

4. The apparatus of claim 1, wherein the product is a beverage.

5. The apparatus of claim 2, wherein the product is a beverage.

6. The apparatus of claim 1, wherein the first circulating heat transfer stream is heated by steam prior to being routed to the pre-heater.

7. The apparatus of claim 1, wherein after the first circulating heat transfer stream pre-heats the product stream, the first circulating heat transfer stream is further cooled by the product or its constituents at a location between the pre-heater and the heat exchanger where heat from the second circulating heat transfer stream is transferred to the first heat transfer stream.

8. The apparatus of claim 7, wherein the product is a beverage.

9. The apparatus of claim 7, wherein the desired temperature is sufficiently high to reduce an undesirable reaction in the product selected from the group consisting of chemical reaction, biochemical reaction, enzymatic reaction, and microbial reaction, and any combination thereof.

10. The apparatus of claim 9, wherein the undesirable reaction that is reduced is microbial reaction.

11. The apparatus of claim 9, wherein the product is a beverage.

12. A method comprising the steps of:
a) forming a product;
b) circulating a first circulating heat transfer stream in a conduit loop;
c) pre-heating the product to a first temperature using the conduit loop comprising the first circulating heat transfer stream after step b);
d) heating the product to a second temperature;
e) placing the heated product in a container;
f) sending the container containing the heated product through a container cooler;
g) cooling product in the container cooler by transferring heat from the container to a second circulating heat transfer stream in a circulating stream; and
h) transferring heat from the second circulating heat transfer stream in a heat exchanger to the first circulating heat transfer stream in the conduit loop,
the first circulating heat transfer stream separate and distinct from the second circulating transfer stream.

13. The method of claim 12, wherein the product is a food product.

14. The method of claim 12, wherein the second temperature is sufficiently high to reduce an undesirable reaction in the product selected from the group consisting of chemical reaction, biochemical reaction, enzymatic reaction, and microbial reaction, and any combination thereof.

15. The method of claim 14, wherein the undesirable reaction that is reduced is microbial reaction.

16. The method of claim 13, wherein the food product is a beverage.

17. The method of claim 14, wherein the product is a food product.

18. The method of claim 17, wherein the food product is a beverage.

19. The method of claim 12, further comprising the step of heating the first heat transfer stream by steam prior to being routed to the pre-heater.

20. The method of claim 12, wherein after the first circulating heat transfer stream pre-heats the product, the first heat transfer stream is further cooled by the product or its constituents at a location between the pre-heater and a location where heat from the second circulating heat transfer stream is transferred to the first circulating heat transfer stream.

21. The method of claim 20, wherein the product is a food product.

22. The method of claim 21, wherein the food product is a beverage.

23. The method of claim 20, wherein the second temperature is sufficiently high to reduce an undesirable reaction in the product selected from the group consisting of chemical reaction, biochemical reaction, enzymatic reaction, and microbial reaction, and any combination thereof.

24. The method of claim 23, wherein the undesirable reaction that is reduced is microbial reaction.

25. The method of claim 23, wherein the product is a food product.

26. The method of claim 25, wherein the food product is a beverage.

* * * * *